United States Patent
Nelson et al.

(10) Patent No.: US 12,356,984 B2
(45) Date of Patent: Jul. 15, 2025

(54) PARAQUAT FORMULATION

(71) Applicant: SYNGENTA CROP PROTECTION AG, Basel (CH)

(72) Inventors: King Nelson, Greensboro, NC (US); Ian David Tovey, Bracknell (GB); Niall Rae Thomson, Bracknell (GB); Guy Ramsay, Bracknell (GB)

(73) Assignee: SYNGENTA CROP PROTECTION AG, Basel (CH)

( * ) Notice: Subject to any disclaimer, the term of this patent is extended or adjusted under 35 U.S.C. 154(b) by 1024 days.

(21) Appl. No.: 17/294,820

(22) PCT Filed: Nov. 18, 2019

(86) PCT No.: PCT/EP2019/081615
§ 371 (c)(1),
(2) Date: May 18, 2021

(87) PCT Pub. No.: WO2020/104359
PCT Pub. Date: May 28, 2020

(65) Prior Publication Data
US 2021/0400954 A1   Dec. 30, 2021

Related U.S. Application Data

(63) Continuation of application No. 16/194,624, filed on Nov. 19, 2018, now abandoned.

(51) Int. Cl.
*A01N 25/04* (2006.01)
*A01N 37/22* (2006.01)
*A01N 43/40* (2006.01)
*A01N 43/54* (2006.01)

(52) U.S. Cl.
CPC ............ *A01N 25/04* (2013.01); *A01N 37/22* (2013.01); *A01N 43/40* (2013.01); *A01N 43/54* (2013.01)

(58) Field of Classification Search
CPC ......... A01N 25/04; A01N 37/22; A01N 43/54
See application file for complete search history.

(56) References Cited

U.S. PATENT DOCUMENTS

| | | | |
|---|---|---|---|
| 4,875,927 A | 10/1989 | Tadros | |
| 5,078,781 A | 1/1992 | Finch, Jr. | |
| 2002/0025986 A1 | 2/2002 | Rodham et al. | |
| 2002/0042345 A1 | 4/2002 | Kocur et al. | |
| 2005/0037923 A1 | 2/2005 | Zagar et al. | |
| 2010/0069246 A1 | 3/2010 | Hacker et al. | |
| 2010/0234230 A1* | 9/2010 | Fowler | A01N 37/22 504/342 |

FOREIGN PATENT DOCUMENTS

| | | | |
|---|---|---|---|
| CN | 88100584 A | 9/1988 | |
| CN | 1049592 A | 3/1991 | |
| CN | 1213271 A | 4/1999 | |
| EP | 0 726 760 B1 * | 6/1999 | ............ A61K 9/107 |
| JP | S6178704 A | 4/1986 | |
| JP | 2000508626 A | 7/2000 | |
| JP | 2001328907 A | 11/2001 | |
| JP | 2003532651 A | 11/2003 | |
| WO | 9100010 A1 | 1/1991 | |
| WO | 9734484 A1 | 9/1997 | |

OTHER PUBLICATIONS

English machine translation of EP 0 726 760 B1 made Apr. 4, 2024. (Year: 2024).*
Written Opinion of the International Searching Authority and International Search Report for International Application No. PCT/EP2019/081615 mailed Feb. 4, 2020.
Hussain, Zahid et al., "Studies of Efficacy of Different Herbicides Against Weeds in Potato Crop in Peshawar", Pak J Bot, Jan. 1, 2013, pp. 487-491, XP55657720.

* cited by examiner

*Primary Examiner* — Michael B. Pallay
(74) *Attorney, Agent, or Firm* — BakerHostetler; Toni-Junell Herbert

(57) ABSTRACT

The present invention relates to pesticidal emulsions comprising an aqueous continuous phase comprising paraquat and at least one polyvinylalcohol or polyvinylalcohol derivative; a dispersed oil phase; a pesticidal active ingredient; and at least two polymeric surfactants selected from a sorbitan ester and an ethoxylated sorbitan ester. It also relates to the use of a pesticidal emulsion to control undesired vegetation.

14 Claims, No Drawings

PARAQUAT FORMULATION

CROSS-REFERENCE TO RELATED APPLICATIONS

This application is a 371 National Stage application of International Application No. PCT/EP2019/081615 filed Nov. 18, 2019, which is a continuation of U.S. application Ser. No. 16/194,624, filed Nov. 19, 2018, the entire contents of these applications are hereby incorporated by reference.

The present invention relates to pesticidal emulsions comprising an aqueous continuous phase comprising paraquat and at least one polyvinylalcohol or polyvinylalcohol derivative, a dispersed oil phase, a pesticidal active ingredient, and at least two polymeric surfactants selected from a sorbitan ester and an ethoxylated sorbitan ester. It also relates to the use of a pesticidal emulsion to control undesired vegetation.

Paraquat is a non-selective, non-residual contact herbicide used to control broad-leaved weeds and grasses and inhibits the growth of plant cell membranes. Paraquat is commonly used in the form of the paraquat dichloride salt.

Butafenacil is a pyrimidindione herbicide used to control broad-leaved weeds and grasses through the inhibition of the protoporphrinogen mode of action, and is described for example in WO91/00278. Butafenacil has been introduced as a complementary component in the products Logran® B-Power™ (a premix of triasulfuron and butafenacil), for the pre-emergent control of grass and broadleaf weeds in wheat, and Touchdown® BPower™ (a premix of glyphosate and butafenacil), for the knockdown control of grass and broadleaf weeds prior to the sowing of cereals crops.

S-metolachlor is a chloroacetanilide herbicide used to control broad-leaved weeds and grasses through the inhibition of the gibberellin pathway, and is described for example in The Pesticide Manual, sixteenth edition, entry 596, page 776.

It would be preferable to extend the use of butafenacil and S-metolachlor as complementary components to formulations comprising paraquat. However, as paraquat is a strong electrolyte it has a high ionic strength which often leads to problems during formulation and especially complications concerning surfactant compatibility.

A variety of emulsifier systems have been proposed and used in the past in order to overcome the difficulties of formulating oils in paraquat solutions. Common emulsifier systems for oil in water (EW) formulations do not work with paraquat, for example phosphate esters, fatty alcohol ethoxylate or propoxylates, calcium dodecyl benzene sulfonate, block-copolymers, polymeric amphoteric and non-ionic could not be combined with paraquat and another oil to deliver a stable emulsion.

We have now unexpectedly and surprisingly achieved a stable emulsion in a paraquat solution through the use of an emulsifier package comprising a polyvinylalcohol-acetate copolymer, a polymeric sorbitan ester surfactant, and a polymeric ethoxylated sorbitan ester surfactant.

Emulsifier compositions containing polyvinylalcohol-acetate copolymers, a polymeric sorbitan ester and a polymeric ethoxylated sorbitan ester are already known. However, applying said emulsifier composition to a highly charged species such as paraquat is unknown.

One of the challenges faced when formulating pesticidal compositions is the compatibility of active ingredients with additional formulation ingredients, such as surfactants. This is especially a challenge when the active ingredient is highly charged. When the emulsifier polyvinylalcohol was formulated as an oil in water emulsion with the charged active ingredients glyphosate and gluphosinate, it was found that the polyvinylalcohol precipitates out of solution. Therefore, it was highly surprising that when polyvinylalcohol was formulated with paraquat, that the polyvinylalcohol readily dissolves in a paraquat dichloride solution.

Such a formulation approach provides both paraquat and an additional pesticidal active ingredient, along with the emulsifier package in a single formulation, which may be applied either directly to a target or may be diluted in a conventional spray tank before being sprayed onto a target. When applied via a spray tank, other conventional adjuvants, may be added to the spray tank prior to spraying. Examples of commercially available tank mix adjuvants include the mineral oil based Nimbus' and non-ionic wetting agent Activator 90™.

In a first embodiment of the invention there is provided a pesticidal emulsion comprising:
 (a) an aqueous continuous phase comprising paraquat at a concentration of from 50 to 360 g/l, and at least one polyvinylalcohol or polyvinylalcohol derivative;
 (b) a dispersed oil phase comprising a heavy aromatic solvent;
 (c) at least one pesticidal active ingredient selected from butafenacil and S-metalochlor dissolved in the dispersed oil phase;
 (d) a polymeric sorbitan ester surfactant; and
 (e) a polymeric ethoxylated sorbitan ester surfactant;
 wherein components (d) and (e) are located at the interface between components (a) and (b).

A disadvantage of this type of emulsion is that it can be susceptible to Ostwald ripening, whereby diffusion through the continuous phase and between the droplets of the dispersed phase can lead to an increase in the median droplet diameter over time. This increase in droplet diameter increases the rate of separation of the dispersed phase driven by density differences. Ultimately this ripening can render the product unfit for use because, for example, it requires re-homogenisation, or because the droplets are too coarse to remain dispersed in the spray tank prior to application to the target, or because the droplets are too large to give an even distribution of the active ingredient when applied to the target.

In a second embodiment of the invention there is provided a use of the pesticidal emulsion in the control of undesired vegetation.

In a third embodiment of the invention there is provided a pesticidal emulsion according to the first embodiment wherein one of the formulation ingredients also behaves as an Ostwald ripening inhibitor.

Pesticidal Active Ingredients

Paraquat may be present at a concentration of from 50 to 360 g/l, preferably from 100 to 360 g/l, more preferably from 150 to 360 g/l, even more preferably from 150 to 300 g/l. Preferably, when component (c) is butafenacil, paraquat may be present at a concentration of 250 g/l. Preferably, when component (c) is S-metolachlor, paraquat may be present at a concentration of 160 g/l.

When component (c) is butafenacil, component (c) may be present at a concentration of from 0.5 to 20 g/l, preferably from 1 to 15 g/l, more preferably from 1 to 10 g/l, and more preferably still from 3 to 10 g/l. Most preferably component (c) may be present at a concentration of 5.55 g/l.

When component (c) is S-metolachlor, component (c) may be present at a concentration of from 150 to 500 g/l, preferably from 200 to 300 g/l, more preferably from 220 to 260 g/l. Most preferably component (c) may be present at a concentration of 240 g/l.

When component (c) is butafenacil, the weight ratio of paraquat to component (c) is preferably from 400:1 to 100:10, more preferably from 300:1 to 200:10, more preferably still from 260:8 to 240:4, and most preferably where component (c) is butafenacil, the weight ratio of paraquat to component (c) is 250:5.55.

When component (c) is S-metolachlor, the weight ratio of paraquat to component (c) is preferably from 300:500 to 50:150, more preferably from 200:300 to 100:200, and most preferably where component (c) is S-metolachlor, the weight ratio of paraquat to component (c) is 160:240.

Polyvinylalcohol or a Polyvinylalcohol Derivative

Polyvinylalcohol or a polyvinylalcohol derivative may be in the form of a polyvinylalcohol-acetate copolymer, and may be present at a concentration of from 10 to 250 g/l.

When component (c) is butafenacil, the polyvinylalcohol-acetate copolymer, may be present at a concentration of from 10 to 100 g/l, preferably 10 to 50 g/l, more preferably from 15 to 40 g/l, even more preferably from 20 to 40 g/l, and more preferably still from 30 to 40 g/l. Most preferably, when component (c) is butafenacil, the polyvinylalcohol-acetate copolymer may be present at a concentration of 37.5 g/l.

When component (c) is S-metolachlor, the polyvinylalcohol-acetate copolymer, may be present at a concentration of from 100 to 250 g/l, preferably from 100 to 200 g/l, more preferably from 150 to 200 g/l. Most preferably, when component (c) is S-metolachlor, the polyvinylalcohol-acetate copolymer may be present at a concentration of from 165 to 170 g/l.

In a preferred embodiment, the polyvinylalcohol-acetate copolymer has a molecular weight of between 25,000 to 150,000, preferably between 25,000 to 110,000, and more preferably between 30,000 to 102,000.

In one set of embodiments, the polyvinylalcohol-acetate copolymer has a molecular weight of between 70,000 to 150,000, preferably between 80,000 to 120,000, and more preferably between 95,000 and 105,000.

In another set of embodiments, the polyvinylalcohol-acetate copolymer has a molecular weight of between 25,000 and 50,000, preferably between 25,000 and 35,000, and more preferably between 28,000 and 32,000.

In a particularly preferred embodiment, the polyvinylalcohol-acetate copolymer is Mowiol® 4-88, a water-soluble hydrocolloid mucoadhesive, which comprises 98% polyvinylalcohol, e.g. available from Sigma-Aldrich, UK.

In a second particularly preferred embodiment, the polyvinylalcohol-acetate copolymer is SELVOL™ 523, e.g. available from Sekisui, USA.

One of the further advantages of utilising a polyvinylalcohol-acetate copolymer having the above molecular weights, is that the copolymer also acts as a formulation thickener, and therefore it is unnecessary to add a conventional thickener such as xanthan to the formulation. This is of particular relevance when formulating paraquat as conventional thickeners such as xanthan disrupt the paraquat dilution.

Polymeric Sorbitan Ester (d)

The polymeric sorbitan ester (d) may be present in the form of a monolaurate ester, a monopalmitate ester, a monostearate ester or a monooleate ester. Preferably, (d) is present as a monolaurate ester or a monopalmitate ester. When component (c) is butafenacil, the polymeric sorbitan ester (d) is present as a monopalmitate ester.

Preferably, when component (c) is S-metolachlor, the polymeric sorbitan ester (d) is present as a monolaurate ester.

In one preferred embodiment, the polymeric sorbitan ester (d) is selected from SPAN™ 20 and SPAN™ 40, e.g. available from Croda, UK. Preferably, when component (c) is butafenacil, the polymeric sorbitan ester (d) is SPAN™ 40. Preferably, when component (c) is S-metolachlor, the polymeric sorbitan ester (d) is SPAN™ 20.

Polymeric Ethoxylated Sorbitan Ester (e)

The polymeric ethoxylated sorbitan ester (e) may be present in the form of a monolaurate ester, a monopalmitate ester, a monostearate ester or a monooleate ester. Preferably, (e) is present as a monolaurate ester or a monopalmitate ester. When component (c) is butafenacil, the polymeric ethoxylated sorbitan ester (e) is present as a monopalmitate ester. Preferably, when component (c) is S-metolachlor, polymeric ethoxylated sorbitan ester (e) is present as a monolaurate ester.

The polymeric ethoxylated sorbitan ester (e) may contain a mean value of from 4 to 20 ethylene oxide groups, preferably from 8 to 20 ethylene oxide groups. In particular the polymeric ethoxylated sorbitan ester (e) may contain a mean value of 4, 8, 12, 16 or 20 ethylene oxide groups. Preferably, when component (c) is butafenacil, the polymeric ethoxylated sorbitan ester (e) contains a mean value of 20 ethylene oxide groups. Preferably, when component (c) is S-metolachlor, the polymeric ethoxylated sorbitan ester (e) contains a mean value of 8 ethylene oxide groups.

In one preferred embodiment, the polymeric ethoxylated sorbitan ester (e) is selected from TWEEN™ 20, TWEEN™ 22 and TWEEN™ 40, e.g. available from Croda, UK. Preferably, when component (c) is butafenacil, the polymeric ethoxylated sorbitan ester (e) is TWEEN™ 40. Preferably, when component (c) is S-metolachlor, the polymeric ethoxylated sorbitan ester (e) is TWEEN™ 22.

Dispersed Oil Phase (b)

The dispersed oil phase (b) comprises a heavy aromatic hydrocarbon solvent. The heavy aromatic hydrocarbon solvent is typically a mixture of heavy aromatic hydrocarbons. Preferably, the heavy aromatic hydrocarbon solvent comprises a mixture of naphthalenes substituted by alkyl groups, wherein said alkyl groups contain from 1 to 4 carbon atoms in total.

More preferably, the naphthalenes substituted by alkyl groups may be present from 50% to 100% by weight of the heavy aromatic hydrocarbon solvent, preferably from 65% to 99%, and more preferably from 75% to 97%, by weight of the heavy aromatic hydrocarbon solvent. In one embodiment, the heavy aromatic hydrocarbon solvent has a low content of naphthalene (i.e. unsubstituted naphthalene); and preferably contains from 0% to 2% or from 0% to 1% of naphthalene by weight of the heavy aromatic hydrocarbon solvent, more preferably from 0.01% to 1% of naphthalene, and even more preferably from 0.05% to 0.7% of naphthalene, by weight of the heavy aromatic hydrocarbon solvent; this is typically called a "naphthalene-depleted" heavy aromatic hydrocarbon solvent.

In one preferred embodiment, the heavy aromatic hydrocarbon solvent comprises Solvesso™ 200 ND, e.g. available from Exxon, Europe. Solvesso™ 200 ND typically has a low percentage (e.g. ca. 0.5%) of (unsubstituted) naphthalene (ND=naphthalene depleted), and comprises also varying percentages of other (e.g. higher) aromatic hydrocarbons, and in particular typically comprises naphthalenes substituted by alkyl groups, wherein said alkyl groups contain from 1 to 4 carbon atoms in total.

In an alternative preferred embodiment, the heavy aromatic hydrocarbon solvent comprises Aromatic™ 200 ND, e.g. available from Exxon, USA. Aromatic™ 200 ND typically has a low percentage (e.g. ca. 0.1% to 0.3%) of (unsubstituted) naphthalene (ND=naphthalene depleted), and comprises also varying percentages of other (e.g. higher) aromatic hydrocarbons, and in particular typically comprises naphthalenes substituted by alkyl groups, wherein said alkyl groups contain from 1 to 4 carbon atoms in total.

The dispersed oil phase (b) may further comprise a paraffinic solvent or an alcohol solvent. The paraffinic solvent is typically an isoparaffinic solvent. In one preferred embodiment, the paraffinic solvent is ISOPAR™ M, e.g. available from Exxon, Europe.

The paraffinic solvent may be present at a concentration of 1 to 50 g/l, preferably from 10 to 40 g/l, more preferably from 15 to 30 g/l, and more preferably still from 20 to 25 g/l. In a particularly preferable embodiment, the paraffinic solvent may be present at a concentration of 22 g/l.

The alcohol solvent is preferably cis-3-hexenol which is also used as an alerting agent in the formulation. The alcohol solvent may be present at a concentration of 0.01 to 5 g/l, preferably from 0.05 to 2.5 g/l, more preferably from 0.5 to 2.5 g/l, and more preferably still from 0.8 to 1.5 g/l.

As used herein, the term "alerting agent" refers to an olfactory or stanching agent which is used to alert the user that the substance should not be ingested.

The pesticidal emulsion of the present invention may also comprise one or more antifoam emulsions, such as a silicone antifoam emulsion, for example SAG 1572.

The pesticidal emulsion of the present invention may further comprise a dye, such as a triarylmethane dye.

The pesticidal emulsion of the present invention may also comprise further alerting or stanching agents, such as pyridine or pyrimidine compounds.

Particle Size

When component (c) is butafenacil, the dispersed oil phase is present as droplets or particles, and said particles have a median diameter (Dv(50)) of 1 μm or less, preferably 500 nm or less, and even more preferably 300 nm or less, as measured by light scattering.

When component (c) is S-metolachlor, the dispersed oil phase is present as droplets or particles, and said particles have a median diameter (Dv(95)) of 2 μm or less, preferably 1.75 μm or less, and even more preferably 1.5 μm or less, as measured by light scattering.

The parameter Dv(50) signifies the point in the size distribution, up to and including which, 50% of the total volume of material in the sample is 'contained', i.e. wherein 50% of the sample's mass is comprised of particles with a diameter less than the value of Dv.

The parameter Dv(95) signifies the point in the size distribution, up to and including which, 95% of the total volume of material in the sample is 'contained', i.e. wherein 95% of the sample's mass is comprised of particles with a diameter less than the value of Dv.

Ostwald Ripening Inhibitors

Ostwald ripening inhibitors, for use in the present invention, are soluble or miscible in the dispersed oil phase, or themselves serve as the dispersed oil phase containing the at least one substantially water-insoluble pesticidally active ingredient. Suitable Ostwald ripening inhibitors include Ostwald ripening inhibitor solvents such as liquid hydrocarbon solvents. A particularly preferred Ostwald ripening inhibitor of the present invention is ISOPAR™ M.

Preferably the total agrochemical concentration in the composition is from 5% to 50% by weight, more preferably from 15% to 45%. When component (c) is butafenacil, the total agrochemical concentration in the composition is preferably from 15% to 30% by weight, more preferably from 20% to 30%. When component (c) is S-metolachlor, the total agrochemical concentration in the composition is preferably from 30% to 50% by weight, more preferably from 35% to 45% by weight.

The Examples which follow service to illustrate the invention. It will be appreciated that modification of detail may be made without departing from the scope of the invention.

FORMULATION EXAMPLE 1: OIL IN WATER EMULSION (EW) CONTAINING PARAQUAT, BUTAFENACIL, POLYVINYLALCOHOL-ACETATE COPOLYMER, SPAN™ 40, TWEEN™ 40, ISOPAR™ M, AND SOLVESSO™ 200

(i) Preparation of Oil Phase

SOLVESSO™ 200 ND and ISOPAR™ M were added together and stirred gently. DOWANOL™ PnB (a propylene glycol n-butyl ether often used to solvate or couple hydrophobic formulation components), may be added if required, followed by TWEEN™ 40. The resulting mixture was heated to about 40° C., followed by the addition of butafenacil, and the mixture stirred until all the butafenacil dissolved. SPAN™ 40 was added and the resulting mixture stirred until all the SPAN™ 40 has dissolved, to provide the oil phase as a clear to slightly hazy oil with no solid material present.

(ii) Preparation of Aqueous Phase

A pre-formed Mowiol® 4-88 solution in water was added to a solution of paraquat dichloride with sufficient mixing to ensure that the Mowiol® 4-88 solution dissolved in the paraquat. The dye, pyridine bases and NaOH solution were then added to provide a brown solution with no solid material present.

(iii) Preparation of the Emulsion

The oil phase was added to the aqueous phase at medium flow rate with high shear mixing. After all the oil phase had been added, the resultant mixture was stirred using the high shear mixer for a further 15 minutes. A fluid dark green emulsion was formed.

Examples of formulations prepared according to Formulation Example 1 are shown in Table 1 below.

TABLE 1

| Ingredient (grams/litre) | A | B | C | D | E |
|---|---|---|---|---|---|
| Paraquat dichloride solution in water (33% w/w paraquat ion) | 757.6 | 757.6 | 757.6 | 757.6 | 757.6 |
| Mowiol ® 4-88 (20% w/w in water) | 100.0$^a$ | 100.0$^a$ | 0.0 | 0.0 | 0.0 |
| Mowiol ® 4-88 (30% w/w in water) | NIL | NIL | 100.0$^b$ | 100.0$^b$ | 125.0$^c$ |
| 10% w/w NaOH | 2.0 | 2.0 | 2.0 | 2.0 | 2.0 |
| Sulfacide blue 5J | 2.5 | 2.5 | 2.5 | 2.5 | 2.5 |
| Pyridine bases | 1.0 | 1.0 | 1.0 | 1.0 | 1.0 |
| Butafenacil (99.3%) | 5.59 | 5.59 | 5.59 | 5.59 | 5.59 |
| DOWANOL ™ PnB | NIL | 23.75 | 23.75 | NIL | NIL |
| SPAN ™ 40 | 2.0 | 2.0 | 2.0 | 2.0 | 2.0 |
| TWEEN ™ 40 | 48.0 | 48.0 | 48.0 | 48.0 | 48.0 |
| ISOPAR ™ M | 22.0 | 22.0 | 22.0 | 22.0 | 22.0 |
| SOLVESSO ™ 200ND | To 1 L | To 1 L | To 1 L | To 1 L | To 1 L |

$^a$20.0 g/l actual Mowiol ®;
$^b$30.0 g/l actual Mowiol ®;
$^c$37.5 g/l actual Mowiol ®

FORMULATION EXAMPLE 2: OIL IN WATER EMULSION (EW) CONTAINING PARAQUAT, BUTAFENACIL, POLYVINYLALCOHOL-ACETATE COPOLYMER, SPAN™ 20, TWEEN™ 22, ISOPAR™ M, AND SOLVESSO™ 200

(i) Preparation of Oil Phase
SOLVESSO™ 200 ND and ISOPAR™ M were added together and stirred gently. DOWANOL™ PnB is added if required, followed by TWEEN™ 22. The resulting mixture was heated to about 40° C., followed by the addition of butafenacil, and the mixture stirred until all the butafenacil dissolved. SPAN™ 20 was added and the resulting mixture stirred until all the SPAN™ 40 has dissolved, to provide the oil phase as a clear to slightly hazy oil with no solid material present.

(ii) Preparation of Aqueous Phase
A pre-formed Mowiol® 4-88 solution in water was added to paraquat dichloride solution with sufficient mixing to ensure that the Mowiol® 4-88 solution dissolved in the paraquat. The dye, pyridine bases and NaOH were then added to provide a brown solution with no solid material present.

(iii) Preparation of the Emulsion
The oil phase was added to the aqueous phase at medium flow rate with high shear mixing. After all the oil phase had been added, the resultant mixture was stirred using the high shear mixer for a further 15 minutes to provide a fluid dark green emulsion.

Examples of formulations prepared according to Formulation Example 2 are shown in Table 2 below.

TABLE 2

| Ingredient (grams/litre) | L | M |
| --- | --- | --- |
| Paraquat dichloride solution in water (typically 33% w/w paraquat ion) | 757.6 | 757.6 |
| Mowiol ® 4-88 (30% w/w in water) | 125.0 | 125.0 |
| 10% w/w NaOH | 2.0 | 2.0 |
| Sulfacide blue 5J | 2.5 | 2.5 |
| Pyridine bases | 1.0 | 1.0 |
| Butafenacil (typically 99.3%) | 5.59 | 5.59 |
| SPAN ™ 20 | 0.88 | 2.0 |
| TWEEN ™ 22 | 21.12 | 48.0 |
| ISOPAR ™ M | 22.0 | 22.0 |
| SOLVESSO ™ 200ND | To 1 L | To 1 L |

Table 3 shows the formulations where the complete emulsifier package (Mowiol® 4-88/SPAN™ 40/TWEEN™ 40) was not used. In these cases the emulsion concentrates did not form.

TABLE 3

| Ingredient (grams/litre) | N | P | Q | R |
| --- | --- | --- | --- | --- |
| Paraquat dichloride solution in water (typically 33% w/w paraquat ion) | 757.6 | 757.6 | 757.6 | 757.6 |
| Mowiol ® 4-88 (30% w/w in water) | 125.0 | 125.0 | NIL | 125.0 |
| 10% w/w NaOH | 2.0 | 2.0 | 2.0 | 2.0 |
| Sulfacide blue 5J | 2.5 | 2.5 | 2.5 | 2.5 |
| Pyridine bases | 1.0 | 1.0 | 1.0 | 1.0 |
| Butafenacil (typically 99.3%) | 5.59 | 5.59 | 5.59 | 5.59 |
| SPAN ™ 40 | NIL | 2.0 | 2.0 | NIL |
| TWEEN ™ 40 | 48.0 | NIL | 48.0 | NIL |
| ISOPAR ™ M | 22.0 | 22.0 | 22.0 | 22.0 |
| SOLVESSO ™ 200ND | To 1 L | To 1 L | To 1 L | To 1 L |

For formulations comprising paraquat and butafenacil, particle size, and physical stability in terms of phase separation were studied over a wide range of temperatures. The results of which are shown in Table 4, below. Crystal growth of butafenacil was also studied as butafenacil crystal growth has been observed in other mixtures of paraquat and butafenacil, due to the recrystallization of butafenacil in aqueous media. The results clearly show that the formulations of this invention do not promote butafenacil crystal growth.

The viscosity of the formulations of the invention were also assessed. Any formulation that contains more than 10% w/w aromatic hydrocarbon must have a viscosity greater than 20.5 mm$^2$/sec at 40° C. (OECD 114 Test Method).

TABLE 4

Stability, Particle Size & Rheology Data

| | Before storage Initial Diameter d(0.9) microns | After storage | | | | Initial Viscosity at 40° C. (mpas) |
| --- | --- | --- | --- | --- | --- | --- |
| | | Diameter d(0.9) microns | Separation | Butafenacil Crystal Growth | Storage Period | |
| A | 0.29 | 0.30 | trace | none | 15 months | 15.1 |
| B | 0.34 | 1.35 | 10% | none | 15 months | 12.9 |
| C | 0.23 | 0.24 | trace | none | 9 months | 22.7 |
| D | 0.25 | 0.24 | trace | none | 9 months | 22.0 |
| E | 0.23 | 0.24 | trace | none | 6 months | 26.5 |
| F | 0.20 | 0.22 | trace | none | 2 years | 23.4 |
| L | 0.50 | 0.52 | trace | none | 2 months | — |
| M | 0.35 | 0.28 | trace | none | 2 months | — |
| N | 0.22 | 0.22 | Trace | none | 2 months | — |
| P | 1.9 | Heavy bottom separation[e] | Heavy bottom separation[e] | Heavy bottom separation[e] | 1 month | — |
| Q | 30.4[d] | NOT TESTED | NOT TESTED | NOT TESTED | NOT TESTED | — |
| R | 3.2 | Heavy bottom separation[e] | Heavy bottom separation[e] | Heavy bottom separation[e] | 1 month | — |

[d]did not emulsify;
[e]test discontinued

FORMULATION EXAMPLE 3: OIL IN WATER EMULSION (EW) CONTAINING PARAQUAT, S-METALOCHLOR, POLYVINYLALCOHOL-ACETATE COPOLYMER, SPAN™ 20, TWEEN™ 22, SELVOL™ 523, AND AROMATIC™ 200

(i) Preparation of Oil Phase

In one container AROMATIC™ 200 ND, TWEEN™ 22, S-metolachlor and SPAN™ 20 were mixed together.

(ii) Preparation of Aqueous Phase

SELVOL™ 523, cis-3-hexenol, silicone anti-foam (SAG 1572), and dye were added to an aqueous solution of paraquat dichloride with sufficient mixing to ensure that the SELVOL™ 523 solution dissolved in the paraquat.

(iii) Preparation of the Emulsion

The oil phase was added to the aqueous phase at slow flow rate with high shear mixing. After all the oil phase had been added, the resultant mixture was stirred at high shear for a further 10 minutes to ensure complete mixing of the two phases.

An example of the formulation prepared according to Formulation Example 3 is shown in Table 5 below.

TABLE 5

An example of the range of formulations which may be prepared according to the invention:

| Ingredient | Quantity (grams/litre) |
| --- | --- |
| Paraquat dichloride | 140-180 |
| Polyvinyl alcohol/acetate | 140-160 |
| Silicon antifoam emulsion | 0.55 |
| Brilliant blue (dye) | 2.5 |
| Pyrimidine base | 0.45 |
| S-metolachlor | 200-280 |
| SPAN ™ 20 | 0.88 |
| TWEEN ™ 22 | 21 |
| Cis-3-hexenol | 1 |
| AROMATIC ™ 200ND | 132 |

The following Tables 6 to 8 provide further example compositions of the ranges listed above in Table 5.

TABLE 6

| Ingredient | Quantity (grams/litre) |
| --- | --- |
| Paraquat dichloride | 140 |
| Polyvinyl alcohol/acetate | 140 |
| Silicon antifoam emulsion | 0.55 |
| Brilliant blue (dye) | 2.5 |
| Pyrimidine base | 0.45 |
| S-metolachlor | 200 |
| SPAN ™ 20 | 0.88 |
| TWEEN ™ 22 | 21 |
| Cis-3-hexenol | 1 |
| AROMATIC ™ 200ND | 132 |

TABLE 7

| Ingredient | Quantity (grams/litre) |
| --- | --- |
| Polysorbate | 17.95-24.29 |
| Sorbitan ester | 0.75-1.01 |
| S-metolachlor | 210-270 |
| Solvent - Naphtha (petroleum) Heavy Aromatic | 112.50-152.21 |
| Paraquat dichloride | 148-180 |
| Water | Rest |
| Polyvinyl alcohol | 12.99-17.57 |

TABLE 8

| Ingredient | Quantity (grams/litre) |
| --- | --- |
| Polysorbate | 21.12 |
| Sorbitan ester | 0.88 |
| S-metolachlor | 240 |
| Solvent - Naphtha (petroleum) Heavy Aromatic | 132.36 |
| Paraquat dichloride | 160 |
| Water | Rest |
| Polyvinyl alcohol | 15.28 |

Example formulations comprising paraquat and S-metolachlor, were tested over a wide range of temperature and time periods for changes in serum, pH, viscosity and particle size. The results of this study are shown in Table 9, below.

TABLE 9

Stability, Particle Size & Rheology Data

| | Serum | pH | Viscosity (cps) | Particle Size (µm) Dv(95) |
| --- | --- | --- | --- | --- |
| Initial | — | 4.54 | 124 | 1.18 |
| 8 wks @ RT | 0 | 4.53 | 78 | 1.32 |
| 8 wks @ 50° C. | 1.9 | 4.36 | 87 | 1.35 |
| 8 wks @ 38° C. | 0 | 4.49 | 86 | 1.33 |
| 8 wks @ 0° C. | 0 | 4.66 | 75 | 1.27 |
| 12 wks @ RT | 0 | 4.49 | 83 | 1.33 |
| 12 wks @ 50° C. | 1.8 | 4.32 | 91 | 1.39 |
| 12 wks @ 38° C. | 0 | 4.41 | 81 | 1.35 |
| 12 wks @ 0° C. | 0 | 4.66 | 75 | 1.27 |
| 24 wks @ RT | 1.9 | 4.50 | 70 | 1.34 |
| 24 wks @ 50° C. | 3.8 | 4.16 | 80 | 1.47 |
| 24 wks @ 38° C. | 1.9 | 4.36 | 70 | 1.38 |
| 24 wks @ 0° C. | 0 | 4.69 | 70 | 1.29 |

Table 9 shows that significant separation (recorded in Table 9 under the title 'Serum') of the formulation was not seen. For some of the samples, especially at higher temperatures, a creaming layer was seen, but this readily mixed back into the formulation.

Glufosinate/Glyphosate Incompatibility with Polyvinylalcohol-Acetate Copolymer (Mowiol® 4-88)

Table 10 details the maximum ratio of polyvinylalcohol-acetate copolymer (Mowiol® 4-88) to glufosinate and water at which the polyvinylalcohol-acetate copolymer does not precipitate. Above these ratios the polyvinylalcohol-acetate copolymer does precipitate, and glufosinate cannot be formulated as an oil-in-water emulsion (EW) at a commercially acceptable concentration using the Mowiol® 4-88/SPAN™ 40 and TWEEN™ 40 system.

TABLE 10

| Ingredient | Quantity % w/w |
| --- | --- |
| Ammonium glufosinate | 8.49 |
| Mowiol ® 4-88 (20% w/w in water) | 1.36 |
| Water | 90.15 |

Table 11 details the maximum ratio of polyvinylalcohol-acetate copolymer (Mowiol® 4-88) to glyphosate and water at which the polyvinylalcohol-acetate copolymer does not precipitate. Above these ratios the polyvinylalcohol-acetate copolymer does precipitate, and glyphosate cannot be formulated as an EW at a commercially acceptable concentration using the Mowiol® 4-88/SPAN™ 40 and TWEEN™ 40 system.

TABLE 11

| Ingredient | Quantity % w/w |
| --- | --- |
| Potassium glyphosate | 5.76 |
| Mowiol ® 4-88 (20% w/w in water) | 0.76 |
| Water | 93.48 |

The invention claimed is:

1. A pesticidal emulsion comprising:
   (a) an aqueous continuous phase comprising paraquat at a concentration of from 50 to 360 g/l, and at least one polyvinylalcohol or polyvinylalcohol derivative;
   (b) a dispersed oil phase comprising a heavy aromatic hydrocarbon solvent;
   (c) at least one pesticidal active ingredient selected from butafenacil and S-metolachlor dissolved in the dispersed oil phase;
   (d) a polymeric sorbitan ester surfactant; and
   (e) a polymeric ethoxylated sorbitan ester surfactant;
   wherein components (d) and (e) are located at the interface between components (a) and (b) and stabilize the emulsion.

2. The pesticidal emulsion of claim 1, wherein the at least one pesticidal active ingredient is butafenacil.

3. The pesticidal emulsion of claim 2, wherein the weight ratio of paraquat to component (c) is from 400:1 to 100:10.

4. The pesticidal emulsion of claim 1, wherein the dispersed oil phase is present as droplets which have a median diameter of 1 μm or less as measured by light scattering.

5. The pesticidal emulsion of claim 1, wherein the at least one pesticidal active ingredient is S-metolachlor.

6. The pesticidal emulsion of claim 5, wherein the weight ratio of paraquat to component (c) is from 300:500 to 50:150.

7. The pesticidal emulsion of claim 1, wherein the dispersed oil phase is present as droplets which have a median diameter of 2 μm or less as measured by light scattering.

8. The pesticidal emulsion of claim 1, wherein the polymeric ethoxylated sorbitan ester (e) has a mean value of from 4 to 20 ethylene oxide groups.

9. A method of controlling vegetation, comprising: diluting and applying the pesticidal emulsion of claim 1 to the vegetation.

10. The pesticidal emulsion of claim 1, wherein the at least one polyvinylalcohol or polyvinylalcohol derivative is a polyvinylalcohol-acetate copolymer.

11. The pesticidal emulsion of claim 10, wherein the polymeric sorbitan ester surfactant is in the form of a monolaurate ester, a monopalmitate ester, a monostearate ester, or a monooleate ester.

12. The pesticidal emulsion of claim 1, wherein the polymeric sorbitan ester surfactant is in the form of a monolaurate ester, a monopalmitate ester, a monostearate ester, or a monooleate ester.

13. The pesticidal emulsion of claim 1, wherein the pesticidal emulsion contains butafenacil and does not crystalize after 2 months.

14. The pesticidal emulsion of claim 1, wherein the pesticidal emulsion contains butafenacil that does not crystalize after 15 months.

* * * * *